G. SITKA.
SAFETY TROLLEY.
APPLICATION FILED MAY 24, 1909.

995,191.

Patented June 13, 1911.

Witnesses:
A. W. Fenstemaker
C. Heymann

Inventor
Gustav Sitka
By Glenn S. Noble
Att'y

UNITED STATES PATENT OFFICE.

GUSTAV SITKA, OF CHICAGO, ILLINOIS.

SAFETY-TROLLEY.

995,191. Specification of Letters Patent. Patented June 13, 1911.

Application filed May 24, 1909. Serial No. 497,914.

*To all whom it may concern:*

Be it known that I, GUSTAV SITKA, a citizen of the United States, residing at Chicago, in the county of Cook and State of Illinois, have invented certain new and useful Improvements in Safety-Trolleys, of which the following is a specification.

This invention relates to trolleys or contact devices used in connection with electric railways for making contact between the moving car and the overhead wire, and its objects are to provide a simple and efficient device whereby the trolley wheel will be held in contact with the wire, to provide means whereby the wire gripping or engaging devices may be readily caused to assume their proper position with relation to the wire when the car is started, and to provide such other advantages and novel features as will appear in the following description.

It is well known that with the ordinary trolley wheel, when there is any unevenness or abrupt change in the direction of the overhead wire, there is a liability of the wheel being thrown down or to one side, so that when the trolley pole swings up, the wheel will fail to engage with the wire and the upwardly projecting pole is liable to do considerable damage to the trolley wire supports before the car can be stopped. With my improved device, the trolley wheel will be held in engagement with the wire at all times and thus avoid such difficulties and objections.

Figure 1:
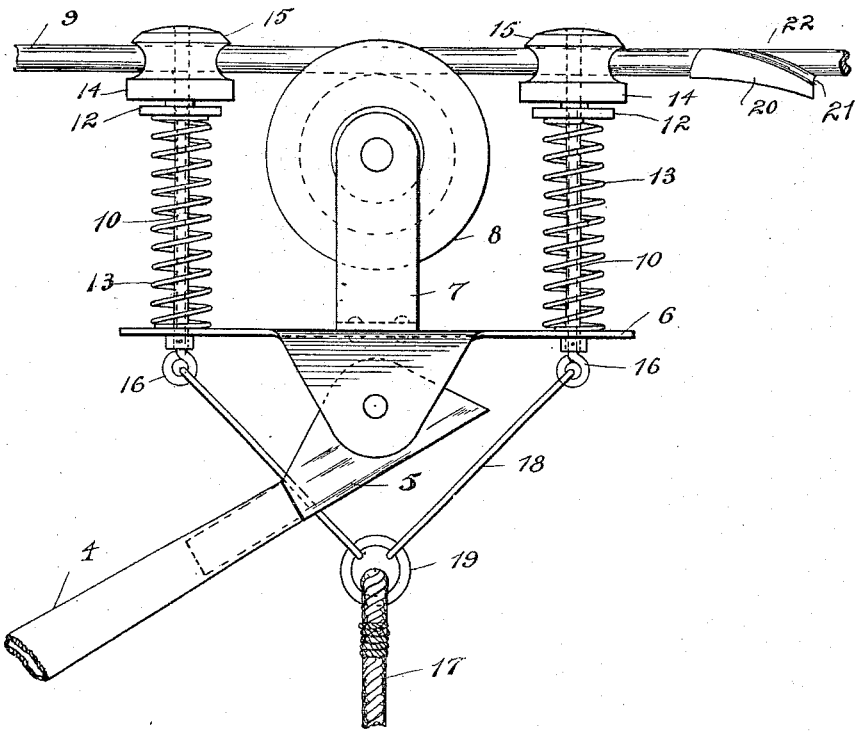
Figure 2:
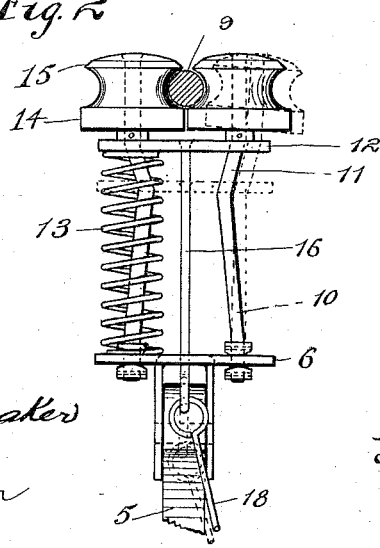
Figure 3:
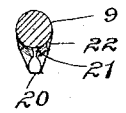

In the accompanying drawings illustrating this invention Figure 1 is a side view of the trolley wheel with its supporting bracket and holding device, shown in connection with a trolley wire provided with means for directing the engaging wheels or rollers to their proper position with respect to the wire; Fig. 2 is an end view of the same, parts being omitted for convenience in illustration; and Fig. 3 is a sectional view of the wire, showing an end view of the device for directing the engaging wheels onto said wire.

As shown in these drawings, 4 indicates the end of a trolley pole of any ordinary or preferred form of construction, which I provide with a specially formed end piece or bearing 5 on which is pivotally supported a plate 6 having stands or arms 7 for supporting the trolley wheel proper 8. The plate 6 is preferably made of light strong material and may be formed with downwardly turned projections, as indicated, for making the pivotal connection with the bearing 5. The end of the bearing 5 is extended or so formed that it will allow a sufficiently wide range of movement of the plate 6 but will engage with the plate to prevent its being swung down too far so that the trolley wheel 8 will not be in proper position for engagement with the wire 9. At either end of the plate 6, I provide upwardly extending rods 10 which are secured in the plate 6 in such a manner that they may move sidewise a short distance. These rods are bent or formed as indicated in Fig. 2 so as to have short diverging portions 11 near the tops thereof, which are engaged by means of a slidable plate or bar 12 having holes therethrough to receive said rods. This plate is normally held in raised position by means of springs 13 which preferably surround the rods 10 and engage at their lower ends with the plate 6. At the tops of the rods 10 are mounted grooved wheels 14 which preferably turn on said rods. These wheels are adapted to engage with the sides of the trolley wire 9 for a sufficient distance so that they will tend to grip the same sufficiently to prevent the trolley wheel from being thrown down away from the wire or being disengaged from the wire when in normal operation. These wheels are preferably curved at the top and provided with beveled edges 15 so as to form a V-shaped groove between their upper surfaces so that they will readily pass up along the sides of the wire to engage therewith. Each of the plates or bars 12 is provided with a downwardly extending rod or wire 16 which preferably passes through holes in the plate 6 and is connected with the trolley rope 17 by means of links 18 and a ring 19, as clearly indicated in Fig. 1.

The operation, which will be readily understood from these figures, is a follows:— When the trolley wheel is to be withdrawn from the wire, as for instance when it is desired to swing the pole around on the car, the operator pulls down on the rope 17 which first depresses the bars or plates 12 against the tension of the springs 13; as the bars 12 move downwardly, for instance to the position indicated in dotted lines in Fig. 2, they act against the inner faces of the diverging portions 11 of the rods 10, which causes the rods to be swung outwardly as indicated in this figure, thereby separating the wheels or rollers 14 a sufficient amount to clear the wire 9; then a further downward movement of the rod causes the main trolley wheel 8 to be withdrawn from the wire, and the device is then in condition for engagement with the wire at another point, as the wheels or rollers 14 will remain spread apart until the device is in proper position with the trolley wheel in contact with the wire, when the rope 17, being released, will allow the springs 13 to raise the bars 12, again drawing the rods 10 toward each other and bringing the wheels in contact with the sides of the trolley wire. In some instances, as for instance at the end of a line, it may be desirable to have some auxiliary means for guiding the wheels or rollers 14 into proper position on the wire 9, so that, even if they are in normal position and are allowed to engage with their upper faces against the under side of the wire, they will be directed into proper position as soon as the car is started. For this purpose I provide a downward projection or lug 20 which may be brazed or soldered to the wire 9 as indicated in Fig. 1 and which is provided with a sharp forward edge 21 which will tend to separate the wheels 14 and direct their upper outwardly projecting edges into grooves 22 which pass up to the upper surface of the wire, so that the wheels will be first spread apart and then allowed to assume their normal position in engagement with the sides of the wire.

Having thus described my invention, which I do not wish to limit to the exact details of construction or arrangement of parts, except as set forth in the following claims, what I claim and desire to secure by Letters Patent is:

1. The combination with a trolley wheel support, rods mounted in said support said rods being bent so as to diverge at their upper ends, grooved wheels mounted on said rods and adapted to engage with the trolley wire, a bar slidably engaging with the diverging portions of said rods, springs for holding said bar in normally raised position, and means connecting with the trolley rope for depressing said bar, the arrangement being such that when said bar moves downwardly it will cause the upper ends of said rods to move away from each other whereby the rollers will be released from the trolley wire.

2. The combination with a trolley pole, of a bearing secured in the end thereof, a plate pivotally mounted on said bearing and limited in its movement by said bearing, a trolley wheel mounted on said plate, pairs of rods having diverging portions mounted on said plate at either side of said wheel, bars engaging with the diverging portions of said rods, springs from said plate to said bars, rods connecting with said bars, means for connecting said rods with the controlling rope, and grooved rollers mounted on said first-named rods and adapted to engage with the trolley wire for holding the trolley wheel in engagement therewith, said rollers being provided with beveled upper surfaces whereby they will readily engage with the trolley wire.

GUSTAV SITKA.

Witnesses:
A. W. FENSTEMAKER,
C. HEYMANN.

Copies of this patent may be obtained for five cents each, by addressing the "Commissioner of Patents, Washington, D. C."